United States Patent [19]

Bühler

[11] Patent Number: 5,292,872
[45] Date of Patent: Mar. 8, 1994

[54] MONOAZO DISPERSED DYES, MIXTURES CONTAINING THEM, AND THE PREPARATION AND THE USE THEREOF

[75] Inventor: Ulrich Bühler, Alzenau, Fed. Rep. of Germany

[73] Assignee: Hoechst Mitsubishi Kasei Co., Tokyo, Japan

[21] Appl. No.: 980,711

[22] Filed: Nov. 24, 1992

[30] Foreign Application Priority Data

Dec. 5, 1991 [DE] Fed. Rep. of Germany ....... 4140036

[51] Int. Cl.$^5$ .................... C09B 29/085; C09B 67/22; D06P 1/18; D06P 3/54
[52] U.S. Cl. ..................... 534/854; 534/597; 534/847; 534/573; 8/639; 8/922
[58] Field of Search ............. 8/639, 922; 534/854, 534/847

[56] References Cited

U.S. PATENT DOCUMENTS

| | | | |
|---|---|---|---|
| 4,424,156 | 1/1984 | Hamprecht et al. | 534/847 |
| 4,448,719 | 5/1984 | Schwander | 534/854 X |
| 4,479,899 | 10/1984 | Hamprecht | 534/847 |

FOREIGN PATENT DOCUMENTS 0043795  1/1982  European Pat. Off. .
391121  10/1990  European Pat. Off. ............ 534/854
2026012  1/1980  United Kingdom ................ 534/854

Primary Examiner—Mary C. Lee
Assistant Examiner—Fiona T. Powers
Attorney, Agent, or Firm—Connolly & Hutz

[57] ABSTRACT

A Monoazo dye of the general formula I

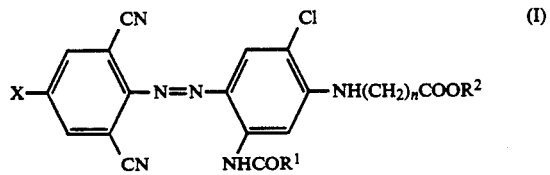

in which
X is methyl, chlorine or bromine
$R^1$ is ethyl, n-propyl, i-propyl, n-butyl or i-butyl
$R^2$ is methyl, ethyl, n-propyl, i-propyl, n-butyl or i-butyl and
n is 2 or 3, mixtures containing dyes of the general formula I and the preparation of these dyes and their mixtures and their use for the dyeing of hydrophobic synthetic materials, in particular for automotive cover fabrics.

15 Claims, No Drawings

MONOAZO DISPERSED DYES, MIXTURES CONTAINING THEM, AND THE PREPARATION AND THE USE THEREOF

The present invention relates to monoazo dyes, mixtures containing monoazo dyes, processes for their preparation and their use for the dyeing of hydrophobic synthetic materials.

EP-A 43,795 has already described dyes which are similar to the dyes according to the invention. However, the former have disadvantages in practical application, in particular with respect to buildup and exhaustion properties. As a result, it is, for example, not possible to achieve good colour depths and the waste water is relatively heavily polluted. Moreover, their relatively large temperature sensitivity tends to lead to variations in the colour depth if the dyeing temperature varies.

The object of the present invention is to provide dyes having improved properties compared with the dyes of EP-A 43,795.

The present invention relates to monoazo dyes of the general formula I

in which
X is methyl, chlorine or bromine
$R^1$ is ethyl, n-propyl, i-propyl, n-butyl or i-butyl
$R^2$ is methyl, ethyl, n-propyl, i-propyl, n-butyl or i-butyl and
n is 2 or 3.

In the general formula I, X is preferably chlorine, $R^1$ is preferably n-propyl and $R^2$ is preferably methyl, n-propyl or i-propyl. $R^2$ is particularly preferably ethyl. n is preferably 2.

Preferred dyes of the general formula I are therefore those of the general formula Ia

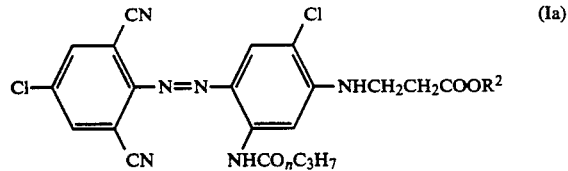

in which $R^{2'}$ is methyl, ethyl, n-propyl or i-propyl.

The present invention also relates to mixtures of at least two monoazo dyes of the general formula I

in which
X is methyl, chlorine or bromine
$R^1$ is methyl, ethyl, n-propyl, i-propyl, n-butyl or i-butyl
$R^2$ is methyl, ethyl, n-propyl, i-propyl, n-butyl or i-butyl and
n is 2 or 3

In preferred mixtures, the individual components of the general formula I only differ in the meaning of n or of $R^2$.

In particularly preferred mixtures, the individual components of the general formula I only differ in the meaning of $R^1$. Very particularly preferably, n is 2 in this case.

In the dye mixtures according to the invention, the ratio of the various dyes of the general formula I can vary within relatively wide limits, and the dyes can be present as crystal mixtures or entirely or in part in the form of mixed crystals. In general, the minimum weight proportion of one component is 10% and its maximum weight portion 90%. In the case of dye mixtures comprising only two dyes of the general formula I, a weight ratio of 70:30 to 30:70 is preferred, i.e. the main proportion of one dye is 30 to 70%.

In a particular embodiment of the present invention, the dyes of the general formula I or their mixtures are shaded with C.I. Solvent Orange 63 or similar dyes.

A further particular embodiment of the present invention relates to mixtures of one or more of the dyes of the general formula I with one or more dyes such as are usually used for the dyeing of polyester fibres or polyester textile materials for automotive cover fabrics. The dyes mentioned for the dyeing of automotive cover fabrics are in particular azo, disazo, anthraquinone, nitro, naphthalimide and terephthalimide dyes. Particularly preferred dyes of this type are the Colour Index dyes Yellow 23, Yellow 42, Yellow 51, Yellow 59, Yellow 71, Yellow 86, Yellow 108, Yellow 122, Yellow 163, Yellow 182, Orange 29, Orange 30, Orange 32, Orange 41, Orange 45, Orange 61, Orange 73, Red 60, Red 86, Red 91, Red 92, Red 127, Red 134, Red 138, Red 159, Red 167, Red 191, Red 202, Red 258, Red 279, Red 284, Red 302, Red 323, Blue 27, Blue 54, Blue 56, Blue 60, Blue 77, Blue 79:1, Blue 87, Blue 266, Blue 333, Violet 27, Violet 28, Violet 57 and Violet 95.

The weight ratios of the dyes of the general formula I or their mixtures and of the dyes mentioned are entirely uncritical and depend on the shade desired.

The dyes according to the invention of the general formula I are preferably prepared by subjecting a compound of the general formula II

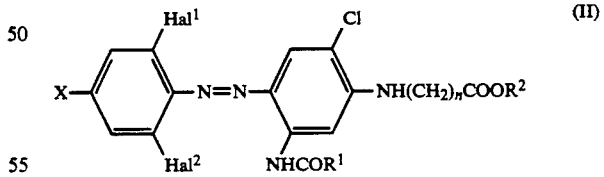

in which $Hal^1$ and $Hal^2$, independently of one another, are chlorine or preferably bromine and $R^1$, $R^2$, X and n are as defined above, to a nucleophilic exchange reaction in which the nucleophile used is the cyanide ion $CN^\ominus$. This reaction, in which chlorine or bromine as Hal is exchanged for CN, is preferably carried out by the procedure of DE-A 1,809,920, DE-A 1,809,921, GB-B 1,184,825, DE-B 1,544,563, DE-A 2,310,745, DE-B 2,456,495, DE-B 2,610,675, DE-A 2,724,116, DE-A 2,724,117, DE-A 2,834,137, DE-A 2,341,109, U.S. Pat. No. 3,821,295, DE-A 2,715,034 or DE-A, 2,134,896.

The compounds of the general formula II are prepared by processes known to one skilled in the art, preferably by diazotising an amine of the general formula III

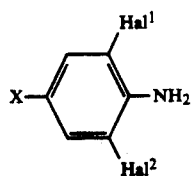

in which X and Hal¹ or Hal² are as defined above, and coupling the product onto an amine of the general formula IV

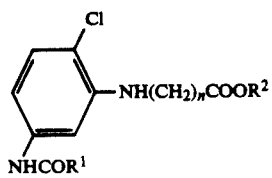

in which $R^1$, $R^2$ and n are as defined above.

The compounds of the general formulae III and IV are known and can be prepared by methods known to one skilled in the art.

The dye mixtures according to the invention can be prepared by various processes, such as, for example:
1. By mixing at least two separately prepared and finished individual dyes of the general formula I.
2. By mixing the separately prepared, unfinished individual dyes and finishing them together.
3. By mixing the starting materials of the general formulae III and IV or II and jointly further reacting them as described above. If, for example, in the cyano exchange process described above instead of an individual compound of the general formula II, a mixture of two or more compounds of the general formula II, which differ with respect to X, $R^1$, $R^2$ and n, is used, the corresponding mixture of the dyes according to the invention of the general formula I is obtained.

The dyes and dye mixtures according to the invention are highly suitable, individually or in a mixture with other disperse dyes, for the dyeing and printing of hydrophobic synthetic materials. Examples of suitable hydrophobic synthetic materials are: secondary cellulose acetate, cellulose triacetate, polyamides and high-molecular-weight polyesters. Preferably, the dyes according to the invention are used for the dyeing and printing of materials made of high-molecular-weight polyesters, in particular those based on polyethylene glycol terephthalates or blends thereof with natural fibre materials, or of cellulose triacetate materials.

The hydrophobic synthetic materials can be present in the form of sheet-like or filament-like structures and may have been processed, for example, to give yarns or woven or knitted textile materials. Dyeing of the fibre material mentioned using the dyes or dye mixtures according to the invention can take place in a manner known per se, preferably from an aqueous suspension, if appropriate in the presence of carriers, between 80° to about 100° C. by the exhaust method or by the HT method in a dyeing autoclave at 110° to 140° C., or by the so-called thermofix process in which the material is padded with the dye liquor and then fixed at about 80° to 230° C. Printing on the materials mentioned can be carried out in a manner known per se by incorporating the dyes or dye mixtures according to the invention in a printing paste and, for fixing the dye, treating the material printed therewith, if appropriate in the presence of a carrier, at temperatures of between 80° to 230° C. with HT steam, pressurised steam or dry heat. This gives brilliant bluish red dyeings of high colour strength and very good general use fastness properties, such as resistance to dry heat setting, wash fastness, water fastness and resistance to thermomigration and in particular of very good lightfastness.

The dyes and dye mixtures according to the invention are very particularly suitable for the dyeing and printing of polyester fibres and polyester textile materials for automotive cover fabrics. To this end, the above-described dyes of the general formula I or mixtures thereof with one or more dyes such as are usually used for the dyeing of automotive cover fabrics are preferably used. Moreover, it is preferred to carry out the dyeing of automotive cover fabrics in the presence of UV absorbers. Examples of suitable UV absorbers are those based on benzophenone or benzotriazole.

Details regarding the dyeing of automotive cover fabrics are described, for example, in Textilveredelung 20 (1985), No. 4, page 126, 20 (1985), No. 11, page 356 and 23 (1988), No. 5, page 170.

The dyes or dye mixtures according to the invention are also suitable for the dyeing of the hydrophobic materials listed above from organic solvents by the methods known therefor. The dyes or dye mixtures according to the invention should be present in the dye liquors and printing pastes used in the above applications as finely divided as possible.

Fine dispersion of the dyes is carried out in a manner known per se by slurrying the dye formed during manufacture together with dispersants in a liquid medium, preferably in water, and subjecting the mixture to the action of shearing forces, as a result of which the dye particles originally present are mechanically comminuted to such an extent that an optimum specific surface area is achieved and sedimentation of the dye is minimised. The particle sizes of the dyes are in general between 0.5 and 5 μm, preferably about 1 μm.

The dispersants used in the milling process can be nonionic or anionic. Examples of nonionic dispersants are reaction products of alkylene oxides, such as, for example, ethylene oxide or propylene oxide with alkylating compounds, such as, for example, fatty alcohols, fatty amines, fatty acids, phenols, alkylphenols and carboxamides. Examples of anionic dispersants are ligno-sulphonates, alkyl- or alkylarylsulphonates or alkylaryl polyglycol ether sulphates.

The dye preparations thus obtained should be pourable for most methods of application. Accordingly, the dye and dispersant content is in these cases limited. In general, the dispersions are brought to a dye content of up to 50 per cent by weight and a dispersant content of up to about 25%. For economic reasons, dye contents are in most cases not allowed to fall below 15 per cent by weight.

The dispersions can also contain further auxiliaries, for example those which act as oxidising agent, such as, for example, sodium m-nitrobenzenesulphonate, or fungicides, such as, for example, sodium o-phenylphenolate and sodium pentachlorophenolate and in particular so-called "acid donors," such as, for example, butyrolactone, monochloroacetamide, sodium chloroacetate, sodium dichloroacetate, sodium 3-chloropropionate, monosulphates, such as, for example, lauryl sulphate, sulphuric esters of ethoxylated and propoxylated alcohols, such as, for example, butylglycol sulphate.

The dye dispersions thus obtained can very advantageously be used for preparing printing pastes and dye liquors. They provide particular advantages, for example, in continuous processes, in which the dye concentration of the dye liquors must be kept constant by continuously feeding dye into the running apparatus.

For certain areas of application, powder formulations are preferred. These powders contain the dye or the dye mixture, dispersants and other auxiliaries, such as, for example, wetting agents, oxidising agents, preservatives and dust-proofing agents and the abovementioned "acid donors."

A preferred preparation process for pulverulent dye preparations consists in removing the liquid from the liquid dye dispersions described above, for example by vacuum drying, freeze drying, by drying on drum dryers, but preferably by spray-drying.

The dye liquors are prepared by diluting the required amounts of the dye formulations prepared in accordance with the details given above with the dyeing medium, preferably with water, such that a liquor ratio of 5:1 to 50:1 is obtained for dyeing. Additionally, further dyeing assistants, such as dispersants, wetting agents and fixation aids, are in general added to the liquor. By adding organic and inorganic acids, such as acetic acid, succinic acid, boric acid or phosphoric acid, the pH is brought to 4 to 5, preferably to 4.5. It is advantageous to buffer the pH obtained and to add a sufficient amount of a buffer system. An advantageous buffer system is, for example, the system acetic acid/sodium acetate.

If it is desired to use the dye or the dye mixture for textile printing, the required amounts of the dye formulations are mixed by kneading in a manner known per se together with thickeners, such as, for example, alkali metal alginates or the like, and, if desired, further additives, such as, for example, fixation accelerators, wetting agents and oxidising agents, to give printing pastes.

Compared with the similar dyes of EP 43,795, the dyes and dye mixtures according to the invention surprisingly have clear advantages, in particular with respect to their buildup and exhaustion properties. Using them, it is possible to obtain greater colour depths and they are more economical, since they show better exhaustion onto the material to be dyed and contaminate the waste water to a lesser degree. Their temperature sensitivity is reduced, i.e. the variations in the colour depth upon variation of the dyeing temperature are smaller. They dye even if the dyeing time is shortened and show exhaustion onto substrates, such as, for example, modified polyester, polyamide, cellulose triacetate and secondary cellulose acetate. A further advantage is that, due to their great colour depth and their particularly clear shade, they are suitable as alternative to C.I. Disperse Red 60 and have clear advantages in terms of costs compared with the latter dye. Owing to their excellent lightfastness even at elevated temperature and humidity, they are furthermore highly suitable for the dyeing of automotive cover fabrics, if appropriate in mixtures as described above.

Accordingly, altogether, the dyes and dye mixtures according to the invention have an unexpected considerable advantage in terms of practical application compared with the prior art.

The invention is illustrated in more detail by the examples which follow. Percentages are by weight.

EXAMPLE 1

60.9 g of the dye of the formula

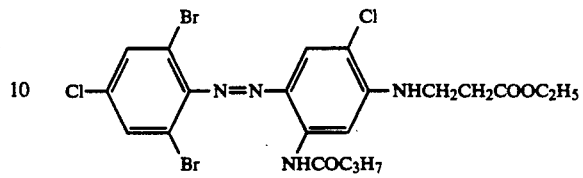

are introduced at 70° to 75° C. into a suspension of 100 ml of dimethyl sulphoxide, 2.1 g of sodium cyanide and 7.1 g of copper(I) cyanide, and the mixture is stirred at this temperature for 30 minutes. The temperature is then raised to 110° C. for 30 minutes, and the batch is then slowly cooled with stirring, the product is filtered off with suction, washed with 45 ml of dimethyl sulphoxide, 7.5% aqueous ammonia solution and water and dried under reduced pressure. This gives 41.8 g of the dye of the formula

which has its absorption maximum at 524 nm and dissolves in o-dichlorobenzene to give a red solution.

0.6 g of the dye thus obtained is stirred into 2000 g of water in finely dispersed form. The dispersion is brought to a pH of 4.5 with acetic acid and sodium acetate, and 2.0 g of a commercially available dispersant based on a naphthalenesulphonic acid/formaldehyde condensation product are added.

The dye liquor thus obtained is entered with 100 g of a polyester fabric based on polyethylene glycol terephthalate, and the fabric is dyed at 130° C. for 45 minutes.

Subsequent rinsing, reduction clearing with a 0.2% sodium dithionite solution at 70° to 80° C. for 15 minutes, rinsing and drying gives a red dyeing of high colour strength and very good colouristic properties, in particular a very good lightfastness and resistance to dry heat setting.

EXAMPLE 2

1.3 g of a commercially available powder preparation of C.I. Disperse Yellow 42, 1 g of a commercially available powder preparation of C.I. Disperse Blue 27 and 0.1 g of the finely disperse dye of the formula

are stirred into 2000 g of water. 4 g of sodium acetate are added to the dispersion, the mixture is brought to a pH of 5 with acetic acid, and 4 g of a commercially available levelling agent based on a linear anionic polycondensation product and 3 g of a commercially available UV absorber based on benzotriazole are added. The dye liquor thus obtained is entered with 100 g of an automotive cover fabric based on polyethylene glycol terephthalate, and the fabric is dyed at 130° C. for one hour. Subsequent rinsing, reduction clearing, rinsing and drying gives a brown dyeing having excellent lightfastness.

EXAMPLE 3

15 g of the dye of the formula

which has its absorption maximum at 508 nm, are incorporated in finely divided form in a printing paste containing 45 g of carob seed flour, 6 g of sodium 3-nitrobenzenesulphonate and 3 g of citric acid per 100 g. If polyester is printed using this printing paste, the printed fabric, after drying, is steamed at a steam pressure of 1.5 superatmospheric pressure for 15 minutes, soaped, rinsed and dried, a yellowish red print of high colour strength and excellent fastness properties is obtained.

In the table below, further dyes and dye mixtures according to the invention are listed, which likewise produce on polyester red dyeings and prints of high colour strength and likewise very good colouristic properties.

| X | R$^1$ | R$^2$ | n | Colour on PES* |
|---|---|---|---|---|
| Cl | iC$_3$H$_7$ | C$_2$H$_5$ | 2 | 1 |
| Cl | nC$_4$H$_9$ | C$_2$H$_5$ | 2 | 1 |
| Cl | iC$_4$H$_9$ | C$_2$H$_5$ | 2 | 1 |
| Cl | C$_2$H$_5$ | nC$_3$H$_7$ | 2 | 1 |
| Cl | C$_2$H$_5$ | nC$_4$H$_9$ | 2 | 1 |
| Cl | iC$_3$H$_7$ | nC$_3$H$_7$ | 2 | 1 |
| Cl | C$_2$H$_5$ | CH$_3$ | 2 | 1 |
| Cl | nC$_3$H$_7$ | CH$_3$ | 2 | 1 |
| Cl | C$_2$H$_5$ | C$_2$H$_5$ | 3 | 1 |
| Cl | C$_2$H$_5$ | CH$_3$ | 3 | 1 |
| Cl | nC$_3$H$_7$ | C$_2$H$_5$ | 3 | 1 |
| Br | C$_2$H$_5$ | C$_2$H$_5$ | 2 | 1 |
| Br | C$_2$H$_5$ | CH$_3$ | 2 | 1 |
| Br | C$_2$H$_5$ | nC$_3$H$_7$ | 2 | 1 |
| Br | nC$_3$H$_7$ | CH$_3$ | 2 | 1 |
| Br | iC$_3$H$_7$ | C$_2$H$_5$ | 2 | 1 |
| Br | nC$_4$H$_9$ | CH$_3$ | 2 | 1 |
| Br | iC$_4$H$_9$ | C$_2$H$_5$ | 2 | 1 |
| Br | C$_2$H$_5$ | CH$_3$ | 3 | 1 |
| Br | C$_2$H$_5$ | nC$_4$H$_9$ | 3 | 1 |
| Br | nC$_3$H$_7$ | C$_2$H$_5$ | 3 | 1 |
| Br | iC$_3$H$_7$ | CH$_3$ | 3 | 1 |
| CH$_3$ | C$_2$H$_5$ | C$_2$H$_5$ | 2 | 2 |
| CH$_3$ | C$_2$H$_5$ | nC$_3$H$_7$ | 2 | 2 |
| CH$_3$ | C$_2$H$_5$ | iC$_3$H$_7$ | 2 | 2 |
| CH$_3$ | C$_2$H$_5$ | CH$_3$ | 2 | 2 |
| CH$_3$ | nC$_3$H$_7$ | CH$_3$ | 2 | 2 |
| CH$_3$ | nC$_3$H$_7$ | C$_2$H$_5$ | 2 | 2 |
| CH$_3$ | iC$_3$H$_7$ | nC$_3$H$_7$ | 2 | 2 |
| CH$_3$ | nC$_4$H$_9$ | CH$_3$ | 2 | 2 |
| CH$_3$ | C$_2$H$_5$ | CH$_3$ | 3 | 2 |
| CH$_3$ | C$_2$H$_5$ | CH$_3$ | 3 | 2 |
| CH$_3$ | nC$_3$H$_7$ | CH$_3$ | 3 | 2 |
| Cl | 50% CH$_3$ 50% nC$_3$H$_7$ | C$_2$H$_5$ | 2 | 1 |
| Cl | 30% CH$_3$ 70% nC$_3$H$_7$ | C$_2$H$_5$ | 2 | 1 |
| Cl | 10% CH$_3$ 90% C$_2$H$_5$ | C$_2$H$_5$ | 2 | 1 |
| Cl | 40% CH$_3$ 60% iC$_3$H$_7$ | C$_2$H$_5$ | 2 | 1 |
| Cl | 20% CH$_3$ 80% nC$_4$H$_9$ | C$_2$H$_5$ | 2 | 1 |
| Cl | 80% C$_2$H$_5$ 20% nC$_3$H$_7$ | C$_2$H$_5$ | 2 | 1 |
| Cl | 90% C$_2$H$_5$ 10% nC$_4$H$_9$ | C$_2$H$_5$ | 2 | 1 |
| Cl | 45% nC$_3$H$_7$ 55% iC$_3$H$_7$ | C$_2$H$_5$ | 2 | 1 |
| Cl | 20% CH$_3$ 80% nC$_3$H$_7$ | CH$_3$ | 2 | 1 |
| Cl | 40% CH$_3$ 60% C$_2$H$_5$ | CH$_3$ | 2 | 1 |
| Cl | 70% C$_2$H$_5$ 30% iC$_4$H$_9$ | CH$_3$ | 2 | 1 |
| Cl | 50% CH$_3$ 50% nC$_3$H$_7$ | nC$_3$H$_7$ | 2 | 1 |
| Cl | 60% CH$_3$ 40% C$_2$H$_5$ | nC$_4$H$_9$ | 2 | 1 |
| Cl | C$_2$H$_5$ | 50% C$_2$H$_5$ 50% nC$_3$H$_7$ | 2 | 1 |
| Cl | C$_2$H$_5$ | 30% CH$_3$ 70% nC$_3$H$_7$ | 2 | 1 |
| Cl | nC$_3$H$_7$ | 60% CH$_3$ 40% C$_2$H$_5$ | 2 | 1 |
| Cl | CH$_3$ | 50% C$_2$H$_5$ 50% nC$_3$H$_7$ | 2 | 1 |
| Cl | CH$_3$ | 60% C$_2$H$_5$ 40% nC$_4$H$_9$ | 2 | 1 |
| Cl | C$_2$H$_5$ | C$_2$H$_5$ | 50% 2 50% 3 | 1 |
| Cl | nC$_3$H$_7$ | C$_2$H$_5$ | 70% 2 30% 3 | 1 |
| 50% Cl 50% Br | C$_2$H$_5$ | C$_2$H$_5$ | 2 | 1 |
| 80% Cl 20% Br | nC$_3$H$_7$ | C$_2$H$_5$ | 2 | 1 |
| 90% Cl 10% CH$_3$ | C$_2$H$_5$ | C$_2$H$_5$ | 2 | 3 |
| 95% Cl 5% CH$_3$ | C$_2$H$_5$ | C$_2$H$_5$ | 2 | 3 |
| 45% Cl 45% Br 10% CH$_3$ | nC$_3$H$_7$ | C$_2$H$_5$ | 2 | 3 |
| Cl | 40% CH$_3$ 60% nC$_3$H$_7$ | 40% nC$_3$H$_7$ 60% CH$_3$ | 2 | 1 |
| Cl | 80% C$_2$H$_5$ 20% nC$_3$H$_7$ | C$_2$H$_5$ | 80% 3 20% 2 | 1 |
| 80% Cl 20% Br | 80% C$_2$H$_5$ 20% nC$_3$H$_7$ | C$_2$H$_5$ | 2 | 2 |
| 50% Cl 50% Br 15% Br | 50% CH$_3$ 50% nC$_3$H$_7$ 15% nC$_4$H$_9$ | 50% nC$_3$H$_7$ 50% C$_2$H$_5$ 15% CH$_3$ | 2 | 1 |
| 80% Cl 5% CH$_3$ | 80% nC$_3$H$_7$ 5% C$_2$H$_5$ | 80% C$_2$H$_5$ 5% C$_2$H$_5$ | 2 | 2 |
| Cl | 20% CH$_3$ 80% nC$_3$H$_7$ | C$_2$H$_5$ | 3 | 1 |
| Cl | nC$_3$H$_7$ | 30% CH$_3$ 70% C$_2$H$_5$ | 3 | 1 |
| Cl | C$_2$H$_5$ | 70% C$_2$H$_5$ 30% nC$_3$H$_7$ | 3 | 1 |
| 50% Cl 50% Br 70% Cl 25% Br 5% CH$_3$ | nC$_3$H$_7$ | C$_2$H$_5$ | 3 | 1 |
| | nC$_3$H$_7$ | C$_2$H$_5$ | 3 | 1 |
| Br | 30% CH$_3$ 70% nC$_3$H$_7$ | C$_2$H$_5$ | 2 | 1 |
| Br | 40% C$_2$H$_5$ 60% nC$_3$H$_7$ | C$_2$H$_5$ | 2 | 1 |
| Br | 50% C$_2$H$_5$ 50% nC$_4$H$_9$ | C$_2$H$_5$ | 2 | 1 |
| Br | 50% nC$_3$H$_7$ 50% iC$_3$H$_7$ | C$_2$H$_5$ | 2 | 1 |
| Br | C$_2$H$_5$ | 50% C$_2$H$_5$ 50% nC$_3$H$_7$ | 2 | 1 |
| Br | nC$_3$H$_7$ | 25% CH$_3$ | 2 | |

-continued

| X | R$^1$ | R$^2$ | n | Colour on PES* |
|---|---|---|---|---|
| Br | iC$_3$H$_7$ | 75% nC$_3$H$_7$ 15% CH$_3$ 85% iC$_3$H$_7$ | 2 | 1 |
| Br | nC$_4$H$_9$ | C$_2$H$_5$ | 60% 2 40% 3 | 1 |
| Br | nC$_3$H$_7$ | C$_2$H$_5$ | 30% 2 70% 3 | 1 |
| Br | 50% C$_2$H$_5$ 50% iC$_3$H$_7$ | 50% nC$_3$H$_7$ 50% C$_2$H$_5$ | 2 | 1 |
| Br | 30% CH$_3$ 70% nC$_3$H$_7$ | 30% nC$_3$H$_7$ 70% CH$_3$ | 2 | 1 |
| Br | 80% nC$_3$H$_7$ 20% C$_2$H$_5$ | 80% C$_2$H$_5$ 20% CH$_3$ | 80% 2 20% 3 | 1 |
| CH$_3$ | 55% CH$_3$ 45% nC$_3$H$_7$ | C$_2$H$_5$ | 2 | 2 |
| CH$_3$ | 35% CH$_3$ 65% iC$_3$H$_7$ | nC$_3$H$_7$ | 2 | 2 |
| CH$_3$ | 70% CH$_3$ 30% nC$_4$H$_9$ | C$_2$H$_5$ | 2 | 2 |
| CH$_3$ | 50% C$_2$H$_5$ 50% nC$_3$H$_7$ | CH$_3$ | 2 | 2 |
| CH$_3$ | 30% C$_2$H$_5$ 70% nC$_4$H$_9$ | CH$_3$ | 2 | 2 |
| CH$_3$ | CH$_3$ | 60% C$_2$H$_5$ 40% nC$_3$H$_7$ | 2 | 2 |
| CH$_3$ | CH$_3$ | 70% C$_2$H$_5$ 30% nC$_4$H$_9$ | 2 | 2 |
| CH$_3$ | C$_2$H$_5$ | 50% C$_2$H$_5$ 50% nC$_3$H$_7$ | 2 | 2 |
| CH$_3$ | nC$_3$H$_7$ | 10% CH$_3$ 90% C$_2$H$_5$ | 2 | 2 |
| CH$_3$ | iC$_3$H$_7$ | 90% C$_2$H$_5$ 10% nC$_3$H$_7$ | 2 | 2 |
| CH$_3$ | nC$_4$H$_9$ | 95% CH$_3$ 5% C$_2$H$_5$ | 2 | 2 |
| CH$_3$ | C$_2$H$_5$ | C$_2$H$_5$ | 50% 2 50% 3 | 2 |
| CH$_3$ | nC$_3$H$_7$ | C$_2$H$_5$ | 70% 2 30% 3 | 2 |
| CH$_3$ | CH$_3$ | nC$_3$H$_7$ | 60% 2 40% 3 | 2 |
| CH$_3$ | 40% CH$_3$ 60% nC$_3$H$_7$ | 40% nC$_3$H$_7$ 60% C$_2$H$_5$ | 2 | 2 |
| CH$_3$ | 60% CH$_3$ 40% nC$_4$H$_9$ | 60% C$_2$H$_5$ 40% CH$_3$ | 2 | 2 |
| CH$_3$ | nC$_3$H$_7$ | 70% C$_2$H$_5$ 30% CH$_3$ | 70% 3 30% 2 | 2 |
| CH$_3$ | CH$_3$ | 10% C$_2$H$_5$ 90% nC$_3$H$_7$ | 10% 3 90% 2 | 2 |
| CH$_3$ | 55% CH$_3$ 45% iC$_3$H$_7$ | C$_2$H$_5$ | 3 | 2 |
| CH$_3$ | C$_2$H$_5$ | 30% C$_2$H$_5$ 70% nC$_3$H$_7$ | 3 | 2 |
| CH$_3$ | 20% CH$_3$ 80% nC$_3$H$_7$ | 20% nC$_3$H$_7$ 80% CH$_3$ | 3 | 2 |
| 80% CH$_3$ 20% Cl | C$_2$H$_5$ | nC$_3$H$_7$ | 2 | 3 |
| 95% CH$_3$ 5% Br | nC$_3$H$_7$ | C$_2$H$_5$ | 2 | 2 |
| 70% CH$_3$ 15% Cl 15% Br | nC$_3$H$_7$ | C$_2$H$_5$ | 2 | 3 |
| Cl | CH$_3$ | C$_2$H$_5$ | 50% 2 50% 3 | 1 |
| Cl | CH$_3$ | nC$_3$H$_7$ | 70% 2 30% 3 | 1 |
| Br | CH$_3$ | 40% C$_2$H$_5$ 60% nC$_3$H$_7$ | 2 | 1 |
| Br | CH$_3$ | 20% C$_2$H$_5$ 80% nC$_4$H$_9$ | 2 | 1 |
| Br | CH$_3$ | nC$_3$H$_7$ | 40% 3 60% 2 | 1 |
| Br | CH$_3$ | C$_2$H$_5$ | 50% 2 50% 3 | 1 |
| 50% Cl 50% Br | CH$_3$ | C$_2$H$_5$ | 2 | 1 |
| 70% Cl 30% CH$_3$ | CH$_3$ | nC$_3$H$_7$ | 2 | 3 |
| Cl | CH$_3$ | 40% C$_2$H$_5$ 60% nC$_3$H$_7$ | 40% 3 60% 2 | 1 |
| 50% Cl 50% Br | CH$_3$ | C$_2$H$_5$ | 3 | 1 |

*1 = bluish red
2 = yellowish red
3 = red

I claim:
1. A monoazo dye of the general formula I

$$X \underset{CN}{\overset{CN}{\underset{\phantom{X}}{\bigcirc}}}-N=N-\underset{NHCOR^1}{\overset{Cl}{\bigcirc}}-NH(CH_2)_nCOOR^2 \quad (I)$$

in which
X is methyl, chlorine or bromine
R$^1$ is ethyl, n-propyl, i-propyl, n-butyl or i-butyl
R$^2$ is methyl, ethyl, n-propyl, i-propyl, n-butyl or i-butyl and
n is 2 or 3.

2. A monoazo dye according to claim 1, characterized in that it has the formula Ia $$Cl \underset{CN}{\overset{CN}{\bigcirc}}-N=N-\underset{NHCO_nC_3H_7}{\overset{Cl}{\bigcirc}}-NHCH_2CH_2COOR^2 \quad (Ia)$$

in which R$^{2'}$ is methyl, ethyl, n-propyl or i-propyl.

3. The monoazo dye according to claim 1, wherein X is chlorine, R$^1$ is n-propyl, R$^2$ is ethyl and n is 2.

4. The monoazo dye according to claim 1, wherein n is 2.

5. A mixture of monoazo dyes comprising the dye as claimed in claim 1, shaded with C.I. Solvent Orange 63.

6. A mixture of at least two monoazo dyes of the general formula I $$X \underset{CN}{\overset{CN}{\bigcirc}}-N=N-\underset{NHCOR^1}{\overset{Cl}{\bigcirc}}-NH(CH_2)_nCOOR^2 \quad (I)$$

in which
X is methyl, chlorine or bromine
R$^1$ is methyl, ethyl, n-propyl, n-butyl or i-butyl
R$^2$ is methyl, ethyl, n-propyl, i-propyl, n-butyl or i-butyl and
n is 2 or 3.

7. A mixture according to claim 6 characterized in that the monoazo dyes of the general formula I differ only in the meaning of R$^1$.

8. A mixture of monoazo dyes which comprises the mixture of monoazo dyes as claimed in claim 6, shaded with C.I. Solvent Orange 63.

9. The mixture according to claim 6, wherein the monoazo dyes of the general formula I differ in the meaning of n.

10. The mixture according to claim 7, wherein the monoazo dyes of general formula I have n as being equal to 2.

11. A mixture of one or more of the monoazo dyes of the general formula I according to claim 1 with one or more dyes suitable for the dyeing of polyester fibres or polyester textile materials for automotive cover fabrics.

12. A mixture according to claim 11 characterized in that the dyes for the dyeing of automotive cover fabrics are azo, disazo, anthraquinone, nitro, naphthalimide or terephthalimide dyes.

13. A process for dyeing and printing hydrophobic synthetic materials comprising applying one or more monoazo dyes of the general formula I according to claim 1 to said materials.

14. A process according to claim 13 wherein the hydrophobic synthetic material is polyester fiber or polyester textile materials suitable for automotive fabrics.

15. A process for dyeing and printing hydrophobic synthetic materials comprising by applying thereto a mixture according to claim 6.

* * * * *